United States Patent [19]

Costanzo

[11] 4,208,986
[45] Jun. 24, 1980

[54] ANIMAL DEODORIZING COLLAR ATTACHMENT

[75] Inventor: Kathryn N. Costanzo, Port Chester, N.Y.

[73] Assignee: D. V. Smith, Wendell, N.C. ; a part interest

[21] Appl. No.: 720,623

[22] Filed: Sep. 3, 1976

[51] Int. Cl.² ............................................. A01K 27/00
[52] U.S. Cl. ................................................... 119/106
[58] Field of Search ................................. 119/106, 156

[56] References Cited

U.S. PATENT DOCUMENTS

| | | | |
|---|---|---|---|
| 2,394,144 | 2/1946 | Brose | 119/106 |
| 2,808,030 | 10/1957 | Costanzo | 119/106 |
| 3,477,409 | 11/1969 | Costanzo | 119/106 |
| 3,814,061 | 6/1974 | Aries et al. | 119/106 |

Primary Examiner—Jay N. Eskovitz
Attorney, Agent, or Firm—Clarence A. O'Brien; Harvey B. Jacobson

[57] ABSTRACT

An elongated housing is provided including opposite ends and an outwardly concave longitudinal side extending between the opposite ends of the housing. The housing includes openings formed through the aforementioned concave longitudinal side thereof at points spaced longitudinally along the housing and structure is provided for securing the housing on a flexible animal collar with the concave side of the housing opposing and extending lengthwise along the outer side of the collar and that portion of the collar extending between the ends of the housing being arcuate and conforming to the arc of the longitudinal side of the housing.

4 Claims, 4 Drawing Figures

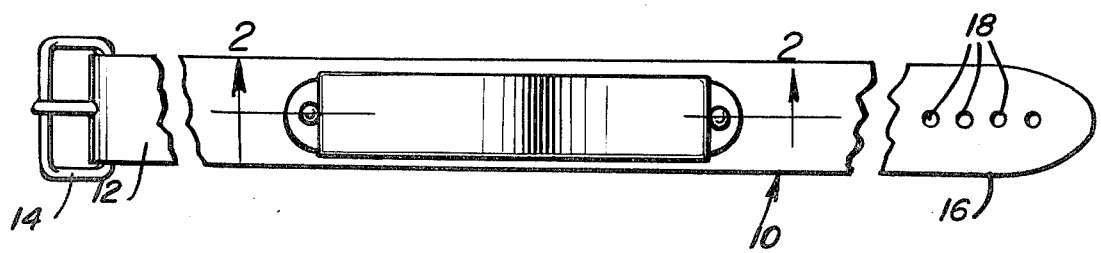
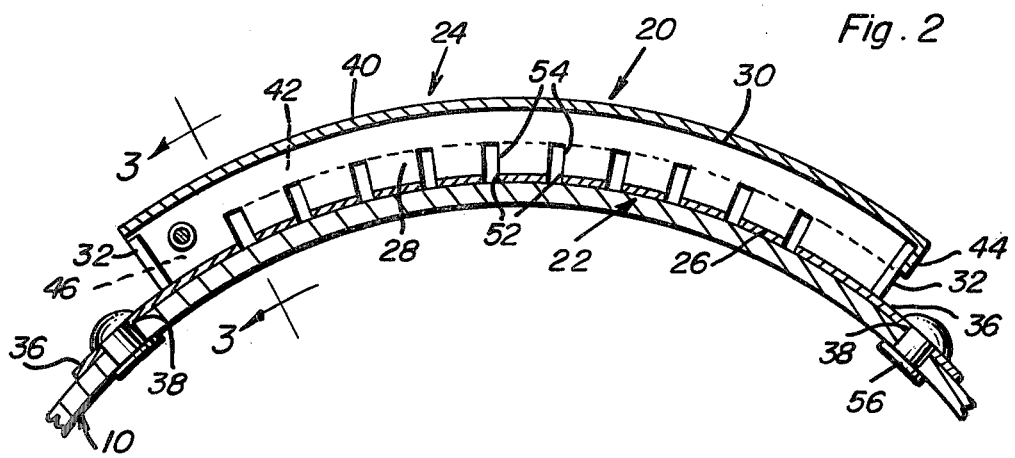
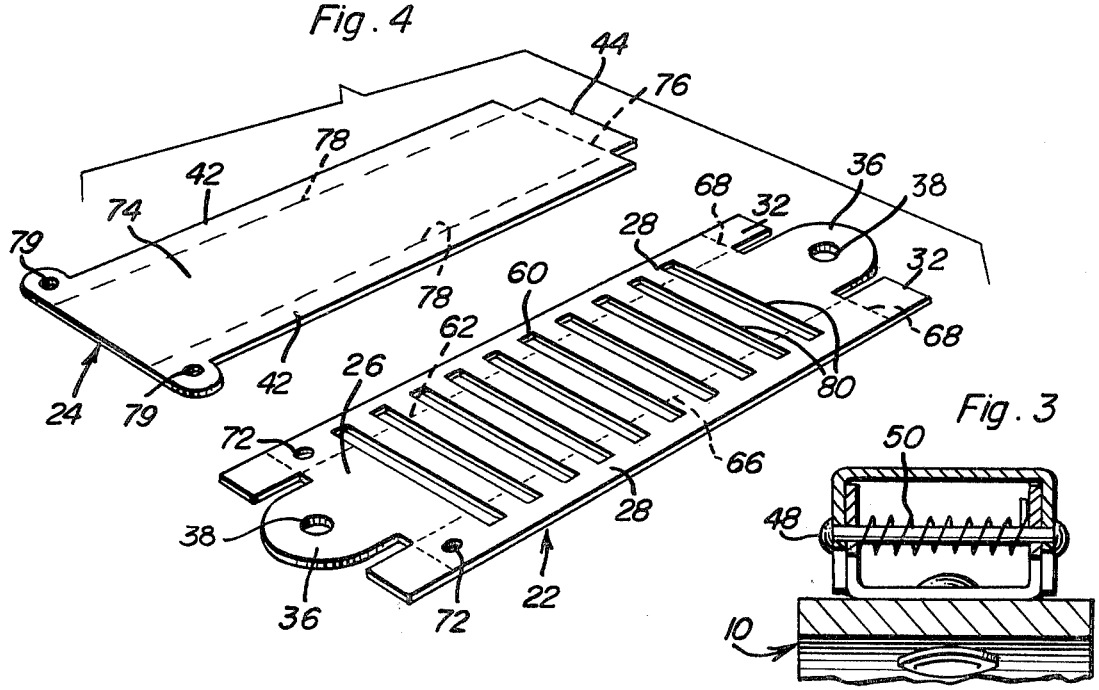
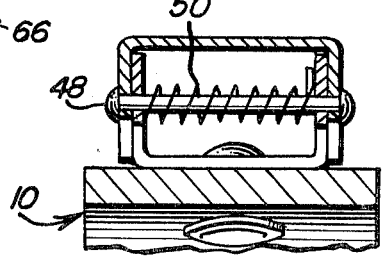

ANIMAL DEODORIZING COLLAR ATTACHMENT

BACKGROUND OF THE INVENTION

Attachments for animal collars to provide a means for conveniently supporting a deodorizing chemical from an animal have been provided and include such attachments as disclosed in my prior U.S. Pat. Nos. 2,808,030 and 3,477,409.

However, some of these attachments require special attaching means while other must be manufactured to fit a collar of a particular width and thickness. As a result, a need exists for a collar attachment for containing a deodorizing chemical with the attachment constructed in a manner whereby it may be secured to substantially all sizes of animal collars.

In addition, certain collar attachments for deodorizing chemicals are constructed in a manner whereby the deodorizing chemicals may come in direct contact with the animal wearing the collar. Accordingly, a further need exists for an attachment to an animal collar for containing a deodorizing chemical and which is constructed in a manner that will insure that the deodorizing chemical will not come in direct contact with the animal wearing the collar.

BRIEF DESCRIPTION OF THE INVENTION

The attachment of the instant invention is in the form of a longitudinally arcuate elongated housing having openings formed in and along the concave side thereof and with means at its opposite ends for attachment of the housing to the outer side of an animal collar with the attachment extending longitudinally along the outer periphery of a section of the collar to which the attachment is secured. The attachment includes longitudinal side walls into which the openings formed in the concave side of the housing extend and the outer convex side of the housing is open, the housing being provided with a hinged cover for closing the open outer side thereof.

The attachment including the housing and the cover thereof may be readily constructed from two strips of bendable material such as metal and the opposite ends of the housing include apertured tabs which may be secured by rivets to longitudinally spaced portions of an associated animal collar between which the housing extends.

The main object of this invention is to provide a collar attachment for animal collars providing a receptacle for containing animal deodorizing chemicals in various forms including aromatic evaporable strips or cakes saturated with slow evaporating liquid or jelly form chemical deodorizing materials. It is also envisioned that the attachment may be utilized to contain anti-flea and tick materials.

Another object of this invention is to provide an attachment for animal collars which may be readily constructed and manufactured at low cost.

Still another object of this invention is to provide an attachment for animal collars in which materials may be housed.

A final object of this invention to be specifically enumerated herein is to provide an attachment for animal collars in accordance with the preceding objects and which will conform to conventional forms of manufacture and be easy to use so as to provide a device that will be economically feasible and relatively trouble free in operation.

These, together with other objects and advantages which will become subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a plan view of an animal collar having an attachment constructed in accordance with the present invention attached thereto;

FIG. 2 is an enlarged fragmentary sectional view taken substantially upon the plane indicated by section line 2—2 of FIG. 1;

FIG. 3 is an enlarged sectional view taken substantially upon the plane indicated by section line 3—3 of FIG. 2; and FIG. 4 is an exploded perspective view of the blank panels which may be utilized in constructing the housing cover components of the attachment.

DETAILED DESCRIPTION OF THE INVENTION

Referring now more specifically to the drawings, the numeral 10 generally designates a conventional form of animal collar including a first end portion 12 equipped with a buckle 14 and a second end portion 16 provided with longitudinally spaced and centrally located apertures 18 whereby the apertured end 16 of the collar 10 may be adjustably anchored to the buckle equipped end 12.

The attachment of the instance invention is referred to in general by the reference numeral 20 and includes an elongated longitudinally arcuate housing referred to in general by the reference numeral 22 and an elongated longitudinally arcuate cover referred to in general by the reference numeral 24 for closing one open side of the housing 22.

The housing 22 includes an elongated longitudinally extending arcuate inner wall 26 which is outwardly concave. The housing 22 includes outstanding generally parallel opposite side walls 28 which project outwardly from the opposite side marginal portions of the inner wall 26. The side walls 28 include outer arcuate marginal edges 30 and the opposite ends of the side walls 28 include right angulated inwardly directed end tabs 32 whose free edges substantially fully abut each other. The ends of the side walls 28 terminate lengthwise inwardly of the corresponding ends of the inner wall 26 which define outward extensions 36 of the inner wall 26 and are apertures as at 38.

The cover 24 includes an arcuate outer wall 40 and opposite side inwardly directed longitudinal side walls 42 which are generally right angulated relative to the outer wall 40. One end of the outer wall 40 includes an extension 44 which is inwardly directed between the corresponding ends of the side walls 42 and the ends of the side walls 42 remote from the inwardly directed extension or tab 44 include apertured ears 46.

A pivot pin 48 is passed through the apertured ears 46 and the corresponding ends of the side walls 28 in order to hingedly support the cover 24 from the left end of the housing 22 illustrated in FIG. 2. Also, a torsion spring 50 is disposed about the pin 48 and includes opposite ends engaged with the housing and the cover 24 in order to yieldingly bias the latter toward the closed position thereof with the cover 24 closing the outer side of the housing.

The longitudinally extending arcuate inner wall 26 of the housing 22 is provided with longitudinally spaced transverse slots 52 including opposite end portions 54 which project into the adjacent portions of the side walls 28.

The radius of curvature of the inner wall 26 may vary according to major changes in the sizes of the collars 10 to which the attachment 20 is to be secured. However, the radius of curvature of the inner wall 26 is such as to closely conform to the average radius of curvature of the associated collar 10 whereby the housing 22 may closely overlie a selected portion of the collar 10 in the manner illustrated in FIG. 2 of the drawings and have the apertured opposite end extensions 36 of the inner wall 26 secured to longitudinally spaced portion of the collar 10 by means of suitable fasteners such as rivets 56. In this manner, the housing defines an openable receptacle which conforms to the average radius of curvature of the collar 10 for receiving animal deodorizing chemicals or the like. From FIGS. 2 and 3 of the drawings, it may be seen that the slots 52 are positioned on the outer side of the collar 10 and that any chemicals received within the housing 20 may be maintained out of direct contact with the animal wearing the collar 10.

With attention invited more specifically to FIG. 4, it may be seen that the housing 22 may be constructed from a single blank 60 of suitable materials such as sheet metal. The blank 60 is folded along fold lines 62 extending longitudinally therealong in order to define the inner and side walls 26 and 28 of the housing 22 and the opposite ends of the opposite side marginal portions of the blank 60 may also be folded as along fold lines 68 in order to form the end tabs 32. Of course, the opposite ends of the central portion of the blank 60 defining extensions may be apertured as at 38 in order to receive the rivets 56 therethrough and one pair of corresponding ends of the opposite side marginal portions of the blank 60 may be apertured as at 72 to receive the end portions of the pin 48 therethrough. Of course, the blank 60 may be cut and punched to form the apertures 38 and 72 in a single operation.

With attention further invited to FIG. 4 of the drawings, it may be seen that the cover 24 may be formed from a single blank 74 and folded along a fold line 76 in order to form the tab 44 and along fold lines 78 to form the side walls 42, the blank 74 being cut to shape and punched to form the apertures 79 for receiving the pin 48 therethrough in a single operation.

With further attention invited to the blank 60, the latter is further provided with longitudinally spaced transverse slots 80 extending into the opposite side marginal portions thereof which form the side walls 28 and the slots 80 enable the housing 22 to be bent, by machine, during the process of manufacture or by hand after purchase by the potential user to the desired arcuate shape in order to conform to the radius of curvature of the collar to which the attachment 10 is to be secured. After the attachment 20 has been secured to the associated collar 10, the cover 24 thereof may be opened and any of the aforementioned forms of chemical animal deodorizing materials or tick and flea repellent materials may be placed within the housing 22. Thereafter, the cover 24 may be closed and the collar 10 may be applied about the neck of the animal to wear the collar.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An attachment for supporting aromatic animal treatment material and the like from a collar worn by an animal, said attachment defining an elongated housing having opposite end portions and defining an outwardly concave arcuate longitudinal side extending between side opposite end portions and including opposite side longitudinal marginal edge portions, said housing further defining longitudinal opposite side walls integral with and extending along said opposite side marginal edge portions and projecting outwardly of the convex side of said longitudinal side, said housing including longitudinally spaced transversely extending elongated slots formed in said longitudinal side extending completely thereacross and into the adjacent marginal portions of said side walls, said opposite end portions including securing means for securing said housing on a flexible animal collar with said concave side of said arcuate longitudinal side opposing and extending along the outer side of said collar and with the collar portion extending between said end portions being arcuate and conforming to the arc of said longitudinal side, said housing including an open longitudinal side opposite said arcuate side, closure means removably closing said open side, said housing being constructed of stiff, but bendable material and the slots formed in said arcuate side and adjacent marginal portions of said side walls enabling the housing to be bent to vary the radius of curvature of said arcuate side to conform to the radii of curvature of animal collars of different sizes.

2. The combination of claim 1 wherein said side walls include laterally bent end tabs defining end walls for said housing.

3. The combination of claim 2 wherein said arcuate side includes opposite end portions projecting outwardly beyond said end walls, said securing means comprising apertures formed through said end portions of said arcuate side adapted to receive rivets therethrough.

4. the combination of claim 1 wherein said means removably closing said open side comprises an elongated arcuate cover pivotally attached at one end to a first end of said housing for swinging between open and closed positions exposing and covering, respectively, said open side.

* * * * *